Sept. 6, 1932.  P. MacKENZIE  1,875,386
AUTOMOTIVE TRANSMISSION
Filed Oct. 6, 1930   4 Sheets-Sheet 1

INVENTOR.
Philip MacKenzie
BY Townsend, Loftus & Abbett
ATTORNEYS.

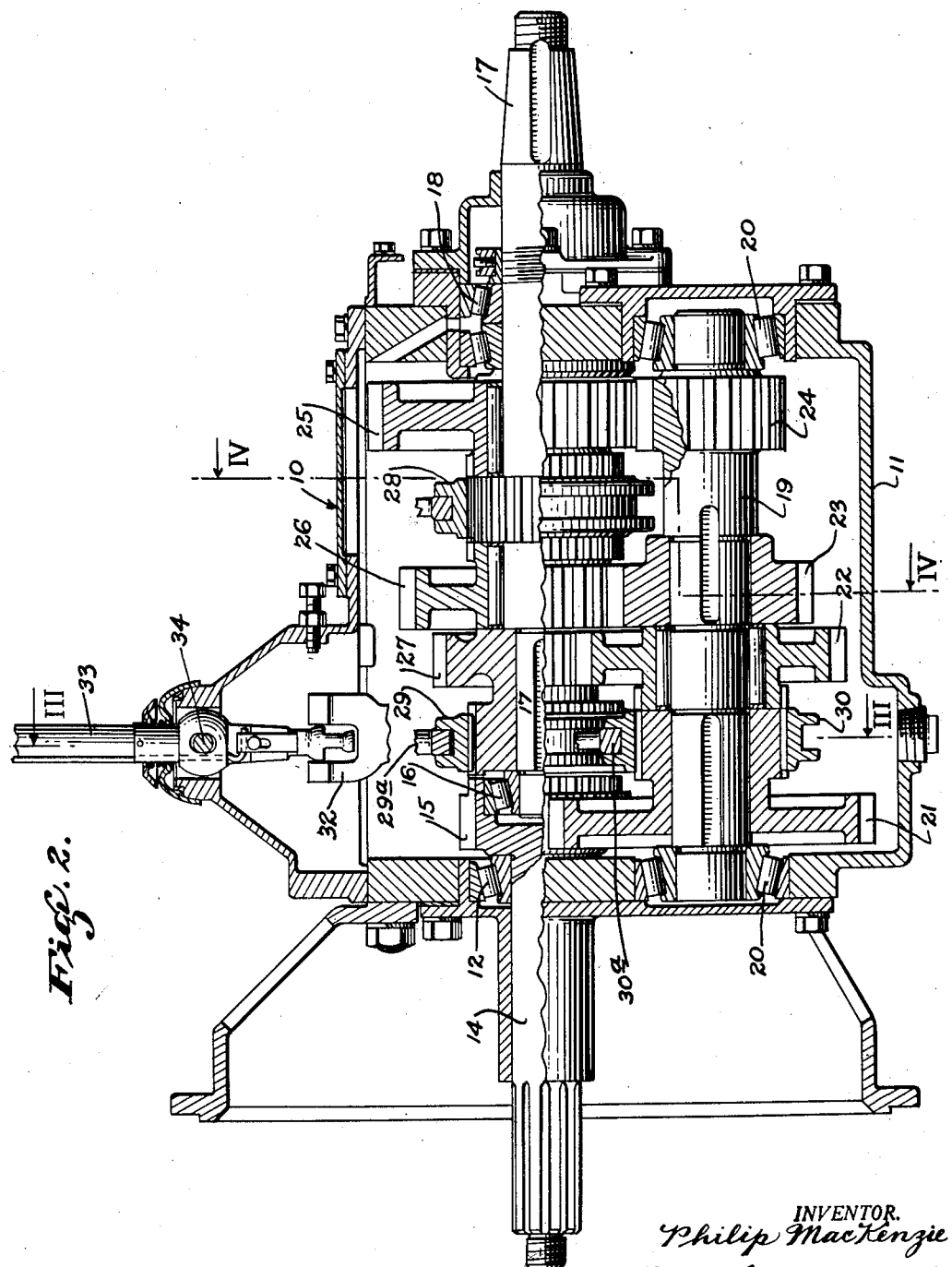

Sept. 6, 1932.  P. MacKENZIE  1,875,386
AUTOMOTIVE TRANSMISSION
Filed Oct. 6, 1930  4 Sheets-Sheet 3
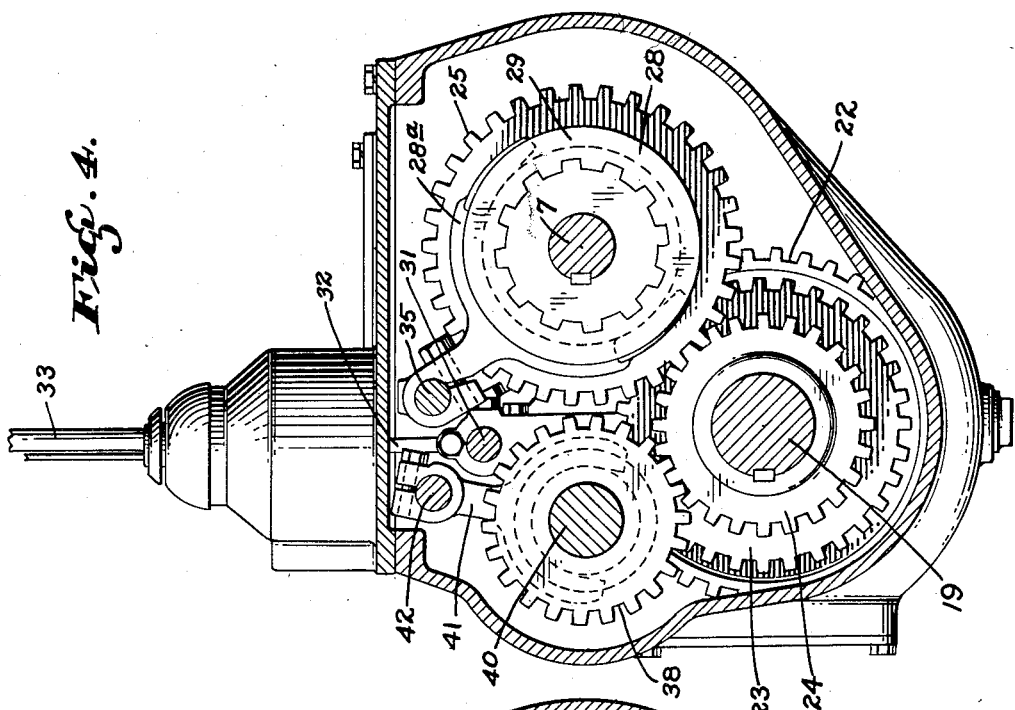
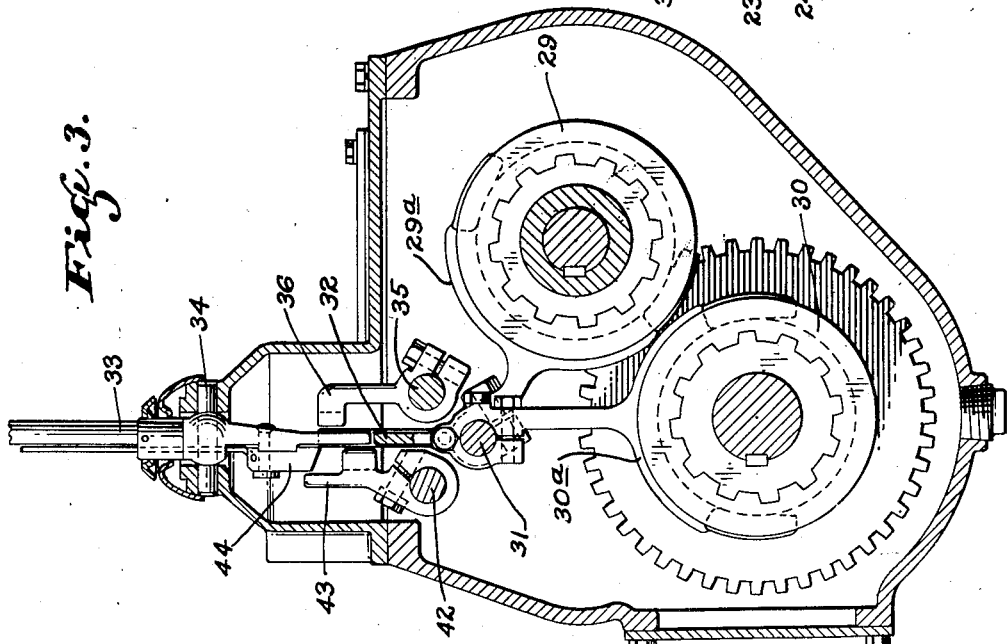
INVENTOR.
Philip MacKenzie
BY Townsend, Loftus & Abbett
ATTORNEYS.

Sept. 6, 1932.        P. MacKENZIE        1,875,386
AUTOMOTIVE TRANSMISSION
Filed Oct. 6, 1930        4 Sheets-Sheet 4
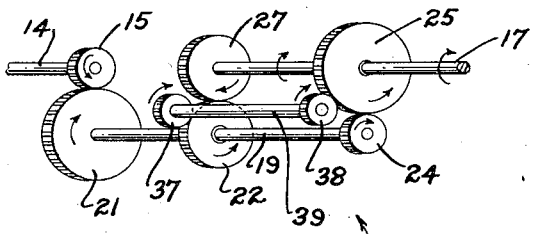
*Fig. 5.*
3rd GEAR.
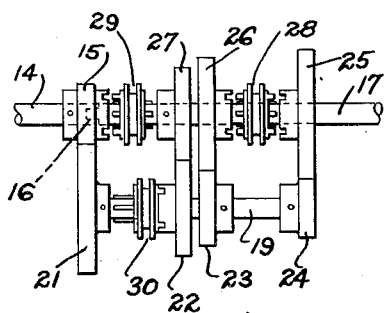
4th GEAR.
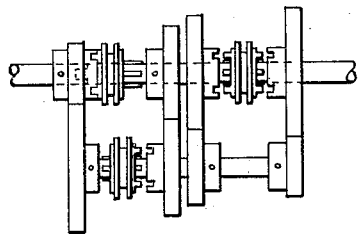
1st GEAR.
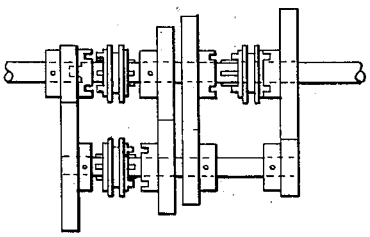
2nd GEAR.
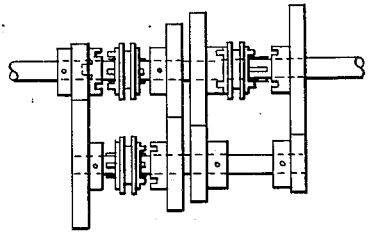
INVENTOR.
Philip MacKenzie
BY
Townsend, Loftus & Abbett
ATTORNEYS.

Patented Sept. 6, 1932

1,875,386

UNITED STATES PATENT OFFICE

PHILIP MacKENZIE, OF OAKLAND, CALIFORNIA

AUTOMOTIVE TRANSMISSION

Application filed October 6, 1930. Serial No. 486,641.

This invention relates to transmissions for automotive vehicles and this application is a continuation in part of my copending application entitled "Automotive transmission," filed August 6, 1929, and bearing Serial Number 383,934.

In this prior application I have disclosed a transmission wherein the gears are in constant mesh and different combinations thereof may be obtained by the use of clutches. The relative disposition of the clutches and gears is such that I am enabled to so compound the gears to obtain four speeds ahead and one reverse speed with a minimum number of gears.

It is the principal object of the present invention to provide an improved automotive transmission of the character disclosed in this prior application referred to wherein by a simple arrangement of clutches and constantly meshing gears I am enabled to obtain four speeds ahead and one reverse speed.

One form which the invention may assume is exemplified in the following description and illustrated by way of example in the accompanying drawings, in which:

Fig. 2 is a vertical section through the transmission.

Fig. 3 is a transverse section through the transmission taken on line III—III of Fig. 2.

Fig. 4 is a similar section taken on line IV—IV of Fig. 2.
Fig. 5 is a diagrammatic view showing the manner in which the clutches are manipulated to obtain the various speeds.

Figure 1:
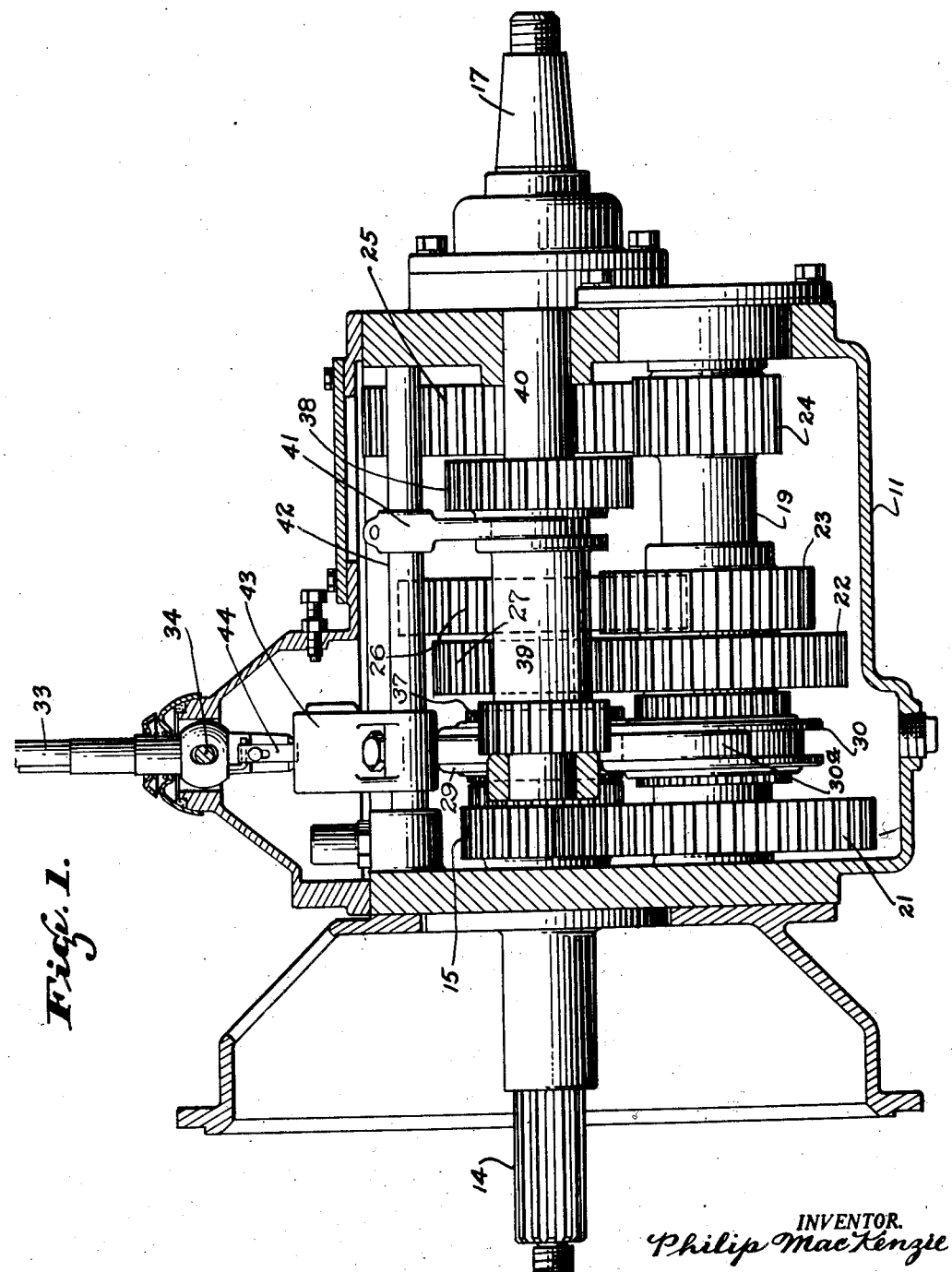
Fig. 1 is a view in side elevation of the transmission with the housing in section.

Referring more particularly to the accompanying drawings, 10 indicates a transmission for automotive vehicles. This transmission comprises a housing 11 which, as in standard practice, encloses all of the operating parts so that they may operate in a lubricant. At the forward end of the transmission the housing is constructed with a bearing assembly 12 which receives and supports a drive shaft 14. The inner end of this drive shaft is formed with a drive shaft gear 15 which is counterbored to receive an anti-friction bearing 16, which in turn rotatably receives the forward end of a driven shaft 17. The other end of this driven shaft 17 is rotatably supported in a bearing 18 mounted at the rear of the transmission housing 11. The driven shaft 17 and the drive shaft 14 are, of course, arranged in axial alignment.

Arranged in parallelism with the drive shaft 14 and the driven shaft 17 is a countershaft 19 which is supported at its ends in bearings 20 at opposite ends of the transmission housing. The countershaft 19 is fitted with a fixed first countershaft gear 21 which is in constant mesh with the drive shaft gear 15 so that when the drive shaft is in operation, the countershaft will be driven through the medium of the gears 15 and 21. The countershaft is also fitted with a second countershaft gear 22 which is normally rotatable on the countershaft and with third and fourth countershaft gears 23 and 24, which are fixed on the countershaft so that they will revolve therewith.

The driven shaft 17 is provided with a low gear 25, a second gear 26 and a third gear 27. The gears 25 and 26 are rotatable on the driven shaft while the third speed gear 27 is keyed or otherwise fixed to the shaft 17.

It will be noticed from Fig. 2 that the peripheries of the adjacent ends of the hubs of the gears 25 and 26 are formed with clutch faces. Likewise, between these adjacent ends of the hubs the shaft 17 is formed with a similar clutch face on which is mounted a clutching member 28. This clutch member is axially movable so as to clutch either of the gears 25 and 26 to the shaft 17. When the transmission is in neutral, the clutch member 28 is out of mesh with both of the clutch portions of the gears 25 and 26 so that they may freely revolve.

It is also desired to point out that the periphery of the drive shaft gear 15 and the hub of the third speed gear 27 are also formed with clutch faces about their periphery, on which is slidably mounted a clutch member 29. This clutch member is operative to connect the gear 15 to the gear 27 so that the drive shaft 14 will be directly connected to the driven shaft 17 to impart a direct drive to the latter.

On the countershaft the adjacent ends of the hubs of the first and second countershaft gears 21 and 22 are likewise formed with clutch faces on their periphery, on which a clutch member 30 is slidably mounted. This clutch member is operative to connect the gear 22 to the gear 21 so as to impart a drive to the gear 22.

Reference being had to Figs. 2 and 5, assuming that the transmission is in neutral as shown in Fig. 2, if it is desired to drive the driven shaft in low speed or at the greatest speed reduction, the clutch 28 is shifted to connect the low gear 25 to the driven shaft 17. A drive will then be imparted from the drive shaft gear 15 to the countershaft 19 through the gear 21 and thence to the driven shaft through the gears 24 and 25.

To obtain a second speed, the clutch member 28 is shifted forwardly releasing gear 25 and securing the gear 26 to the driven shaft 17. A drive will then be transmitted from the drive shaft 14 to the countershaft through the gears 15 and 21 and thence to the driven shaft 17 through the gears 23 and 26.

To obtain a third speed, the parts are placed in neutral position and the clutch member 30 is operated to clutch the second countershaft gear 22 to the first countershaft gear 21. The drive is then from the drive shaft 14 to the countershaft through the gears 15 and 21 and thence to the driven shaft 17 through the gears 22 and 27.

To obtain a fourth speed, which is direct drive, the parts are placed in neutral and the clutch 29 is shifted to clutch the drive shaft gear 15 to the third speed gear 27 and as this latter gear is keyed on the shaft 17 a direct drive will be imparted to the latter.

In order to shift the clutches, I have provided a shift mechanism most clearly disclosed in Figs. 2, 3 and 4. In these figures it will be seen that the clutches 29 and 30 are engaged by yokes 29a and 30a which are both fixed on a single shift shaft 31 having a shift lever engaging dog 32 arranged in vertical alignment with a shift lever 33, which lever is connected as at 34 to the transmission housing in a conventional manner. The shift dog 32 on the shift shaft 31 is so arranged that if the lever 33 is not shifted laterally, forward and rearward oscillation thereof will operate the clutches 29 and 30. Rearward movement of the upper end of the lever shifts the clutch 29 to obtain direct drive and shifting forwardly of the upper end of the lever 33 moves the clutch member 30 rearwardly to so connect the parts as to obtain the third speed.

To operate the clutch 28, it is fitted with a shifting yoke 28a which is connected to a shift shaft 35 having a dog 36 secured thereon with which the lower end of the shift lever 33 is adapted to engage when the upper end of the shift lever 33 is moved laterally in one direction. In other words, when the upper end of the shift lever is moved to the left, it disengages from the dog 32 on the shaft 31 and engages the dog 36 so that forward or rearward movement of the upper end of the lever will engage the clutch member 28 either with the gear 25 or 26 depending upon which direction the upper end of the lever is shifted.

To drive the driven shaft 17 in a direction the reverse of that of drive shaft 14, I provide a pair of reverse gears 37 and 38 fixed on a spool 39 slidably mounted on a shaft 40 fixed in the transmission housing. This spool 39 is engaged by a yoke 41 secured on a shift shaft 42. This shift shaft is provided with a dog 43 at the side of the lever 33 opposite that of the dog 36 on the shift shaft 35.

It will be noticed that the lever 33 is fitted with a latch member 44 which normally prevents the lower end of the lever 33 from engaging the dog 43. However, when this latch is moved upwardly the upper end of the lever 33 may be shifted laterally in a direction enabling the lower end of the lever 33 to engage the dog 43 and thus reciprocate the reverse shift shaft 42.

By engaging the lower end of the lever 33 with the dog 43 and shifting the upper end of the lever 33 forwardly, the spool 39 is shifted rearwardly of the transmission, placing the reverse gear 38 into mesh with the driven shaft gear 25 and also placing the reverse gear 37 into mesh with the second countershaft gear 22. Thus, a drive will be transmitted as shown in Fig. 5 from the shaft 14 to the countershaft 19 through the medium of the gears 15 and 21 to the low speed gear 25 which is free to revolve on the shaft 17. This gear will drive the gears 37 and 38 and as the gear 37 is in mesh with a rotatable gear 22 on the countershaft the latter will be driven, and as it is in mesh with a fixed gear 27 on the driven shaft the latter will be driven and a reverse drive imparted to the driven shaft 17. It is believed that this will be clear from Figs. 1 to 5.

In operation of the device, if it is desired to drive the driven shaft at the lowest speed, the parts are placed in neutral and the upper end of the shift lever is moved laterally to the left and then forwardly which operates the clutch 28 to connect the low speed gear 25 to the driven shaft so that the drive through the countershaft will be imparted to the driven shaft.

To obtain second speed the upper end of the lever is held in its lateral position and shifted directly rearwardly which causes the clutch 28 to clutch the second speed gear 26 to the driven shaft 17 so that the countershaft drive will be imparted from the countershaft to the driven shaft through the gears 23 and 26.

To obtain a third speed, the lever is shifted back to its neutral position and then shifted back to center and directly forwardly which shifts the clutch 30 rearwardly, clutching the second countershaft gear 22 to the first countershaft gear 21, causing a drive to be transmitted from the drive shaft to the second countershaft gear 22 and thence to the driven shaft 17 through the gear 27.

To obtain a fourth speed, which is direct drive, the lever is shifted directly rearwardly on the center line so as to move the clutch 30 to neutral and then to move the clutch 29 to a position directly connecting the gear 15 to the third speed gear 27 which is fixed on the shaft 17. This will directly connect the drive shaft 14 to the driven shaft 17 so as to obtain a direct drive.

To obtain a reverse speed, the lever 33 is shifted to its neutral position and then shifted laterally to the right and then forwardly which places the reverse gear 38 into mesh with the low speed gear 25 and places the reverse gear 37 into engagement with the second countershaft gear 22. When the gears are in this position, the low speed gear 25 will be free to revolve on shaft 17 and the second countershaft gear 22 will also be free to revolve on the countershaft 19. Thus, a drive will be transmitted from the drive shaft 14 to the countershaft through the medium of the gears 15 and 21 and from the countershaft to the gear 25 through the medium of the fourth countershaft gear 24. The low speed gear 25 will drive the reverse gears 37 and 38 and impart a drive to the second countershaft gear 22 freely rotatable on the shaft 19. As this second countershaft gear 22 is in mesh with the third speed gear 27, which is keyed on the shaft 17, the latter will be driven in a direction the reverse of that of the drive shaft 14.

From the foregoing it is obvious that I have provided a very simple transmission wherein the gears are in constant mesh and wherein through the manipulation of three clutches I obtain four speeds ahead and one reverse.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A transmission including a casing, a drive shaft projecting into the casing, a driven shaft journalled in the casing in alignment with the drive shaft, a countershaft in the casing disposed parallel to the drive and driven shafts, a drive gear fixed to the drive shaft, a first countershaft gear fixed on the countershaft in constant mesh with the drive gear, a first speed gear and a second speed gear both rotatably mounted on the driven shaft, a third speed gear fixed on the driven shaft, gears fixed on the countershaft in constant mesh with the first and second speed gears, a rotatable gear on the countershaft in constant mesh with the third speed gear, clutch means operative to clutch the first or second speed gears to the driven shaft, clutch means to clutch the first countershaft gear to the rotatable countershaft gear, and clutch means to clutch the third speed gear to the drive shaft.

2. A transmission including a casing, a drive shaft projecting into the casing, a driven shaft journalled in the casing in alignment with the drive shaft, a countershaft in the casing disposed parallel to the drive and driven shafts, a drive gear fixed to the drive shaft, a first countershaft gear fixed on the countershaft in constant mesh with the drive gear, a first speed gear and a second speed gear both rotatably mounted on the driven shaft, a clutch member intermediate said gears and operative to clutch either thereof to the driven shaft, a third speed gear fixed on the driven shaft, a clutch member associated with the third speed gear and the drive gear and operative to clutch the same together, a rotatable gear on the countershaft in mesh with the third speed gear, and a clutch member associated with the first countershaft gear and the rotatable countershaft gear and operative to clutch the same together.

3. A transmission including a casing, a drive shaft projecting into the casing, a driven shaft journalled in the casing in alignment with the drive shaft, a countershaft in the casing disposed parallel to the drive and driven shafts, a drive gear fixed to the drive shaft, a first countershaft gear fixed on the countershaft in constant mesh with the drive gear, a first speed gear and a second speed gear both rotatably mounted on the driven shaft, a clutch member intermediate said gears and operative to clutch either thereof to the driven shaft, a third speed gear fixed on the driven shaft, a clutch member associated with the third speed gear and the drive gear and operative to clutch the same together, a rotatable gear on the countershaft in mesh with the third speed gear, a clutch member associated with the first countershaft gear and the rotatable countershaft gear and operative to clutch the same together, and clutch operating means operative to operate said clutch members in desired sequence.

4. A transmission including a casing, a drive shaft projecting into the casing, a driven shaft journalled in the casing in alignment with the drive shaft, a countershaft in the casing disposed parallel to the drive and driven shafts, a drive gear fixed to the drive shaft, a first countershaft gear fixed on the countershaft in constant mesh with the drive gear, a first speed gear and a second speed gear both rotatably mounted on the driven shaft, a clutch member intermediate said gears and operative to clutch either thereof to the driven shaft, a third speed gear fixed on the driven shaft, a clutch member associated with the third speed gear and the drive gear and operative to clutch the same together, a rotatable gear on the countershaft in mesh with the third speed gear, a clutch member associated with the first countershaft gear and the rotatable countershaft gear and operative to clutch the same together, a pair of relatively fixed reverse gears capable of being simultaneously shifted into mesh with the low speed gear and the rotatable countershaft gear when said clutch members are in neutral position to drive the driven shaft in a direction reverse to that of the drive shaft.

5. A transmission including a casing, a drive shaft projecting into the casing, a driven shaft journalled in the casing in alignment with the drive shaft, a countershaft in the casing disposed parallel to the drive and driven shafts, a drive gear fixed to the drive shaft, a first countershaft gear fixed on the countershaft in constant mesh with the drive gear, a first speed gear and a second speed gear both rotatably mounted on the driven shaft, a clutch member intermediate said gears and operative to clutch either thereof to the driven shaft, a third speed gear fixed on the driven shaft, a clutch member associated with the third speed gear and the drive gear and operative to clutch the same together, a rotatable gear on the countershaft in mesh with the third speed gear, a clutch member associated with the first countershaft gear and the rotatable countershaft gear and operative to clutch the same together, a pair of axially aligned reverse gears relatively fixed together, one gear being positioned to mesh with the low speed gear and the other to mesh with the rotatable countershaft gear when shifted to operative position, and a shift lever operatively connected to the clutch members and to said reverse gears and operative to operate said clutch members in desired sequence and to shift said reverse gears into operative position when the clutch members are in neutral position.

6. A transmission including a casing, a drive shaft rotatably mounted in the casing, a driven shaft mounted in the casing in axial alignment with the drive shaft, a countershaft mounted in the casing in parallelism to the driven shaft, a drive gear fixed on the drive shaft, a first countershaft gear fixed on the countershaft in constant mesh with the drive gear, a second countershaft gear rotatably mounted on the countershaft, third and fourth countershaft gears fixed on the countershaft, a third speed gear fixed on the driven shaft in constant mesh with the second countershaft gear, a second speed and a low speed gear rotatably mounted on the driven shaft and in mesh with the third and fourth countershaft gears, clutch means associated with the low speed and second speed gears and operative to clutch either thereof to the driven shaft, clutch means associated with the drive and third speed gears and operative to clutch the same together, clutch means associated with the first and second countershaft gears and operative to clutch the same together, and a shift lever to operate said clutch means in desired sequence.

7. A transmission including a casing, a drive shaft rotatably mounted in the casing, a driven shaft mounted in the casing in axial alignment with the drive shaft, a countershaft mounted in the casing in parallelism to the driven shaft, a drive gear fixed on the drive shaft, a first countershaft gear fixed on the countershaft in constant mesh with the drive gear, a second countershaft gear rotatably mounted on the countershaft, third and fourth countershaft gears fixed on the countershaft, a third speed gear fixed on the driven shaft in constant mesh with the second countershaft gear, a second speed and a low speed gear rotatably mounted on the driven shaft and in mesh with the third and fourth countershaft gears, clutch means associated with the low speed and second speed gears and operative to clutch either thereof to the driven shaft, clutch means associated with the drive and third speed gears and operative to clutch the same together, clutch means associated with the first and second countershaft gears and operative to clutch the same together, a pair of relatively fixed reverse gears adapted to be placed in mesh one with the low speed gear and the other with the second countershaft gear, and a shift lever operative to operate said clutch means and said reverse gears in desired sequence.

8. A transmission including a casing, a drive shaft rotatably mounted in the casing, a driven shaft mounted in the casing in axial alignment with the drive shaft, a countershaft mounted in the casing in parallelism to the driven shaft, a drive gear fixed on the drive shaft, a first countershaft gear fixed on the countershaft in constant mesh with the drive gear, a second countershaft gear rotatably mounted on the countershaft, third and fourth countershaft gears fixed on the countershaft, a third speed gear fixed on the driven shaft in constant mesh with the second countershaft gear, a second speed and a low speed gear rotatably mounted on the driven shaft and in mesh with the third and fourth countershaft gears, clutch means associated with the low speed and second speed gears and operative to clutch either thereof to the driven shaft, clutch means asociated with the drive and third speed gears and operative to clutch the same together, clutch means associated with the first and second countershaft gears and operative to clutch the same together, reverse gears adapted to be placed in mesh one with a rotatable gear on the driven shaft and the other with a rotatable gear on the countershaft, and a shift lever operative to operate said clutch means and said reverse gears in desired sequence.

PHILIP MacKENZIE.